(12) United States Patent
Banerjee et al.

(10) Patent No.: US 12,008,403 B2
(45) Date of Patent: Jun. 11, 2024

(54) SYSTEM FOR ELECTRONIC IDENTIFICATION OF ATTRIBUTES FOR PERFORMING MAINTENANCE, MONITORING, AND DISTRIBUTION OF DESIGNATED RESOURCES

(71) Applicant: BANK OF AMERICA CORPORATION, Charlotte, NC (US)

(72) Inventors: Sayan Banerjee, Morganville, NJ (US); Peter Michael Farrell, Bridgewater, NJ (US); Aftab Khan, Richardson, TX (US); Beena Khushalani, Moorpark, CA (US); Ashwin Roongta, East Brunswick, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 644 days.

(21) Appl. No.: 17/155,348

(22) Filed: Jan. 22, 2021

(65) Prior Publication Data
US 2022/0237035 A1   Jul. 28, 2022

(51) Int. Cl.
*G06F 16/00* (2019.01)
*G06F 9/50* (2006.01)
*G06F 16/25* (2019.01)
*G06N 20/00* (2019.01)

(52) U.S. Cl.
CPC .......... *G06F 9/5011* (2013.01); *G06F 16/258* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 5,884,310 A * | 3/1999 | Brichta | G06F 16/278 |
| 7,165,216 B2 * | 1/2007 | Chidlovskii | G06F 16/84 |
| | | | 707/999.1 |
| 8,296,832 B2 | 10/2012 | Atwood et al. | |
| 8,375,213 B2 | 2/2013 | Borneman et al. | |
| 10,032,281 B1 | 7/2018 | Ghesu et al. | |

(Continued)

OTHER PUBLICATIONS

Parth Shah et al. "Legal Clause Extraction From Contract Using Machine Learning with Heuristics Improvement." IEEE, 2018 4th International Conference, Dec. 14-15, 2018. https://ieeexplore.ieee.org/document/8777602.

(Continued)

*Primary Examiner* — Farhan M Syed
(74) *Attorney, Agent, or Firm* — Moore & Van Allen PLLC; Nicholas C. Russell

(57) ABSTRACT

Embodiments of the present invention provide a system for electronic identification of attributes for performing maintenance, monitoring, and distribution of designated resource assets. In particular, the system may be configured to extract one or more legacy resources from a data repository of an entity system associated with an entity, wherein the legacy resources are in a first format, convert the one or more legacy resources from the first format to a second format, process the one or more legacy resources, via one or more machine learning models, identify one or more attributes based on processing the one or more legacy resources via the one or machine learning models, and implement one or more actions based on the one or more attributes.

17 Claims, 5 Drawing Sheets

(56) References Cited

U.S. PATENT DOCUMENTS

| | | |
|---|---|---|
| 10,346,166 B2 | 7/2019 | Chen et al. |
| 10,346,986 B2 | 7/2019 | Xu et al. |
| 10,402,751 B2 | 9/2019 | Ferrarons Llagostera et al. |
| 10,535,138 B2 | 1/2020 | Pfeiffer |
| 2004/0083148 A1 | 4/2004 | Chadrow |
| 2005/0154979 A1* | 7/2005 | Chidlovskii ............ G06F 16/84 707/E17.124 |
| 2006/0155638 A1 | 7/2006 | de la Motte |
| 2007/0061713 A1* | 3/2007 | Chidlovskii .......... G06F 40/154 707/999.1 |
| 2008/0133396 A1 | 6/2008 | De La Motte |
| 2009/0106140 A1 | 4/2009 | De La Motte |
| 2014/0172728 A1 | 6/2014 | Lenkov et al. |
| 2018/0285996 A1 | 10/2018 | Ma |
| 2019/0213498 A1 | 7/2019 | Adjaoute |
| 2019/0236598 A1 | 8/2019 | Padmanabhan |
| 2019/0251694 A1 | 8/2019 | Han et al. |
| 2020/0280565 A1* | 9/2020 | Rogynskyy ......... G06F 16/2379 |
| 2023/0043131 A1* | 2/2023 | Rogynskyy ......... G06F 16/2379 |

OTHER PUBLICATIONS

Noel Vouitsis. "Machine Learning for Contracts Analysis—Put Your Human Mind Where It Really Matters." Swish Team. https://medium.com/swishlabs/machine-learning-for-contracts-analysis-put-your-human-mind-where-it-really-matters-7cb5395c65c7.

Jerrold Tsin Howe Soh. "Legal topic classification: A comparative study of text classifiers on Singapore Supreme Court judgments." Singapore Management University, Institutional Knowledge at Singapore Management University, Research Collection School of Law, Jul. 2019. https://core.ac.uk/download/pdf/287750675.pdf.

Michael J. Bommarito, II. "LexNLP: Natural language processing and information extraction for legal and regulatory texts." Lex Predict, LLC., Jun. 10, 2018. https://core.ac.uk/download/pdf/287750675.pdf.

* cited by examiner

SYSTEM FOR ELECTRONIC IDENTIFICATION OF ATTRIBUTES FOR PERFORMING MAINTENANCE, MONITORING, AND DISTRIBUTION OF DESIGNATED RESOURCES

BACKGROUND

Conventional systems do not have the capability to effectively perform one or more actions associated with designated resources. As such, there exists a need for a system to identify one or more attributes for performing maintenance, monitoring, and distribution of designated resources.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for electronic identification of attributes for performing maintenance, monitoring, and distribution of designated resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention extracts one or more legacy resources from a data repository of an entity system associated with an entity, wherein the legacy resources are in a first format, converts the one or more legacy resources from the first format to a second format, processes the one or more legacy resources, via one or more machine learning models, identifies one or more attributes based on processing the one or more legacy resources via the one or machine learning models, and implements one or more actions based on the one or more attributes.

In some embodiments, the present invention processes the one or more legacy resources based on segmenting data in the one or more legacy resources, via the one or more machine learning models.

In some embodiments, the segmentation of the data is based on a combination of at least two segmentation techniques.

In some embodiments, the present invention processes the one or more legacy resources based on vectorizing data in the one or more legacy resources, via the one or more machine learning models, wherein vectorization of the data converts the data from the second format to a third format.

In some embodiments, the present invention vectorizes the data based on using a combination of disparate feature vectors.

In some embodiments, the present invention performs cross-validation, in response to processing the one or more legacy resources.

In some embodiments, each machine learning model of the one or more machine learning models identifies an attribute of the one or more attributes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
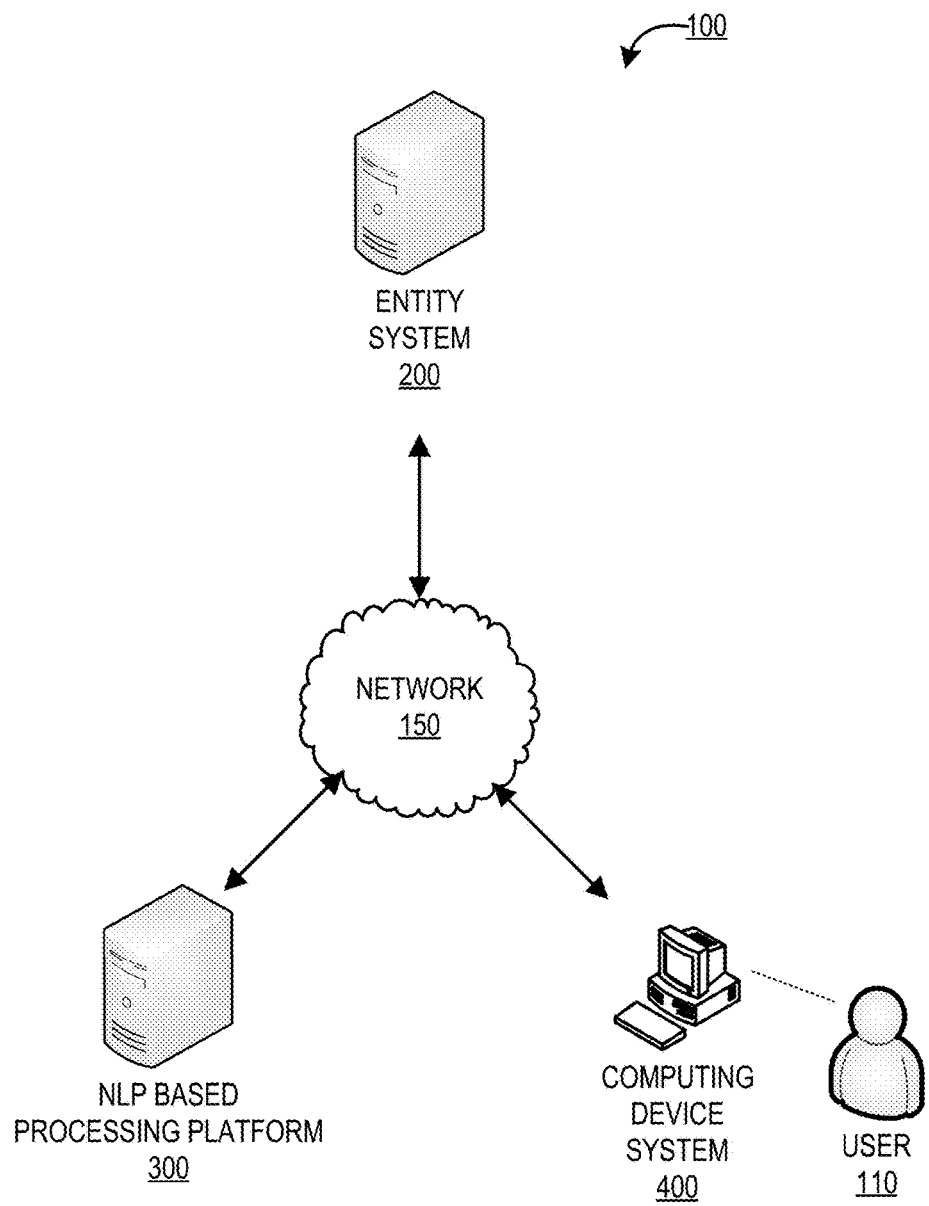
Figure 2:
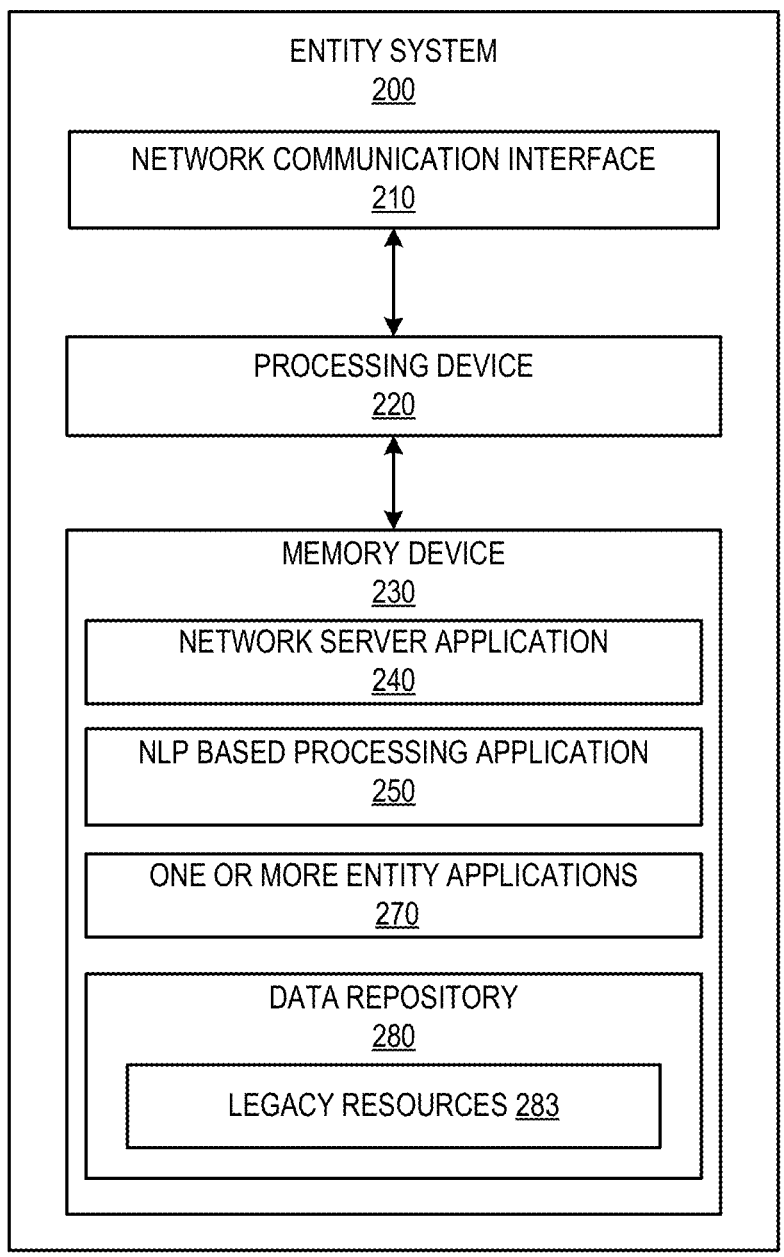
Figure 3:
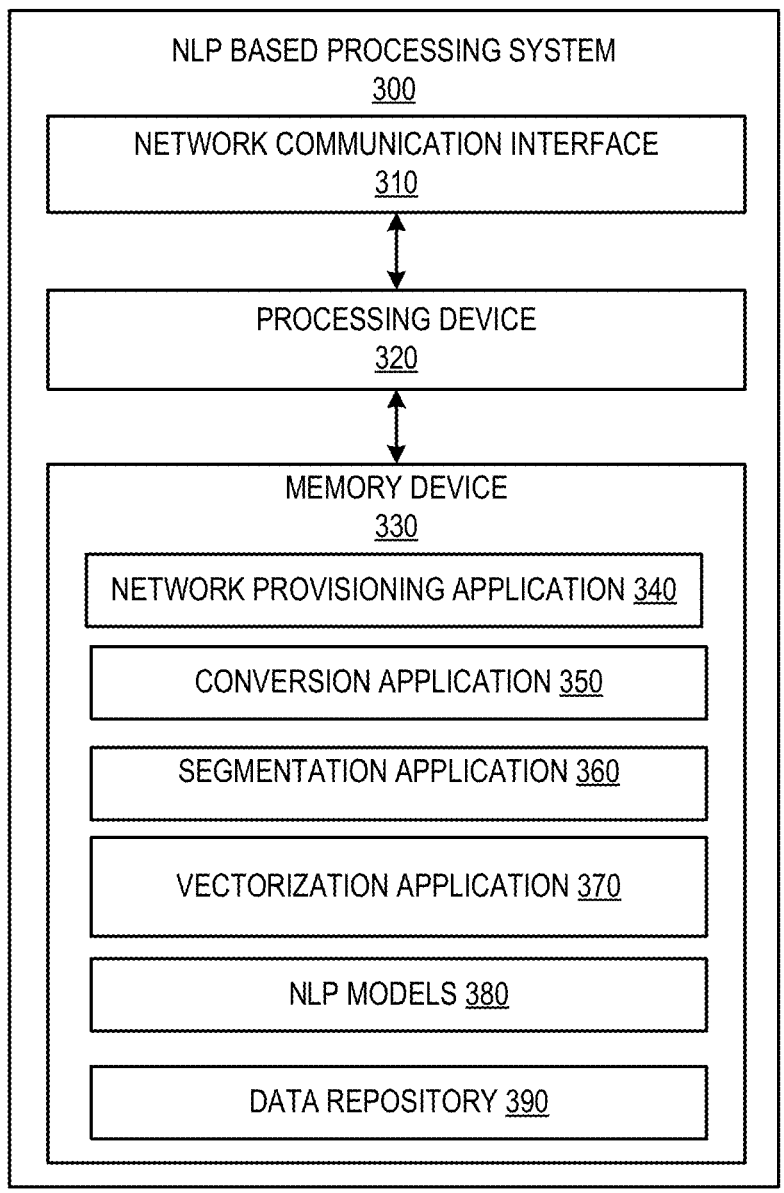
Figure 4:
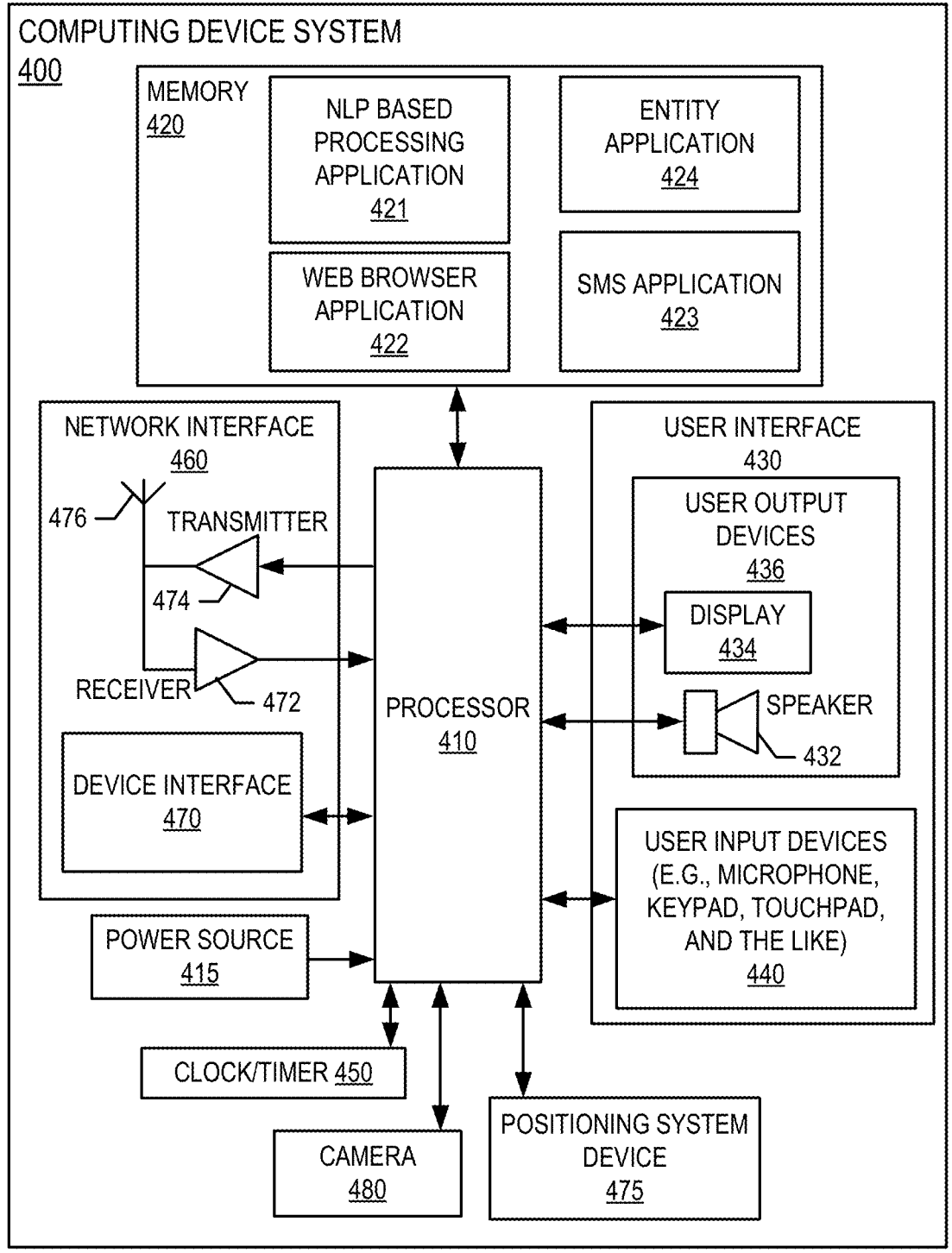
Figure 5:
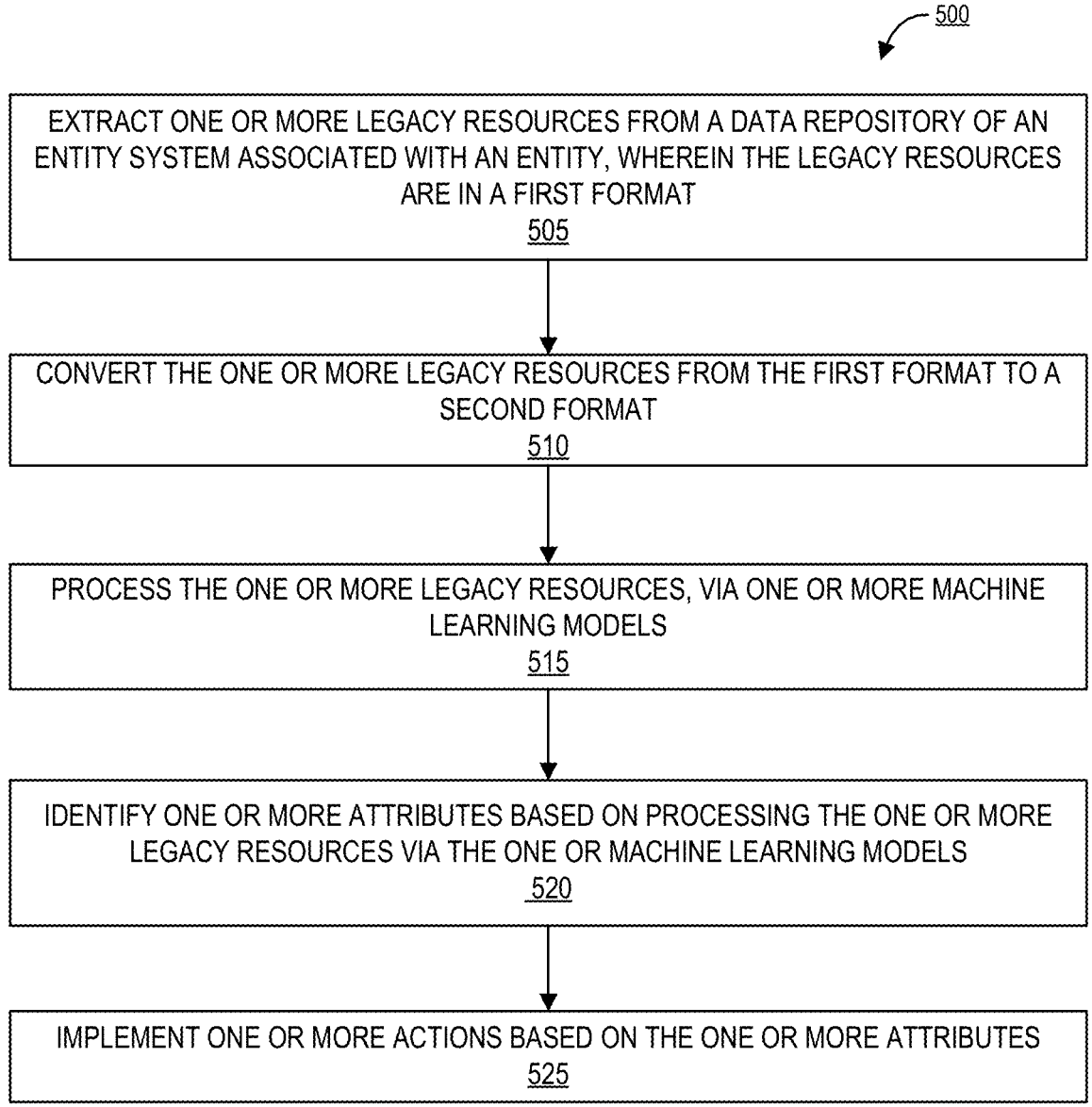

Having thus described embodiments of the invention in general terms, reference will now be made the accompanying drawings, wherein:

FIG. 1 provides a block diagram illustrating a system environment for electronic identification of attributes for performing maintenance, monitoring, and distribution of designated resources, in accordance with an embodiment of the invention;

FIG. 2 provides a block diagram illustrating the entity system 200 of FIG. 1, in accordance with an embodiment of the invention;

FIG. 3 provides a block diagram illustrating an NLP based processing system 300 of FIG. 1, in accordance with an embodiment of the invention;

FIG. 4 provides a block diagram illustrating the computing device system 400 of FIG. 1, in accordance with an embodiment of the invention; and FIG. 5 provides a block diagram illustrating a process flow for electronic identification of attributes for performing maintenance, monitoring, and distribution of designated resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "entity" may be any institution which involves in financial transactions. In one embodiment, the term "entity" or "resource entity" may be a financial institution which administers trust associated with legacy resources (e.g., trust agreement). As described herein, a "third party entity" may be a customer or a potential customer of the entity. In some embodiments, a "third party entity" may be a financial institution customer (e.g., an account holder). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by the financial institution. In some embodiments, "designated resources" may be properties and/or funds associated with accounts of the third party entity. In some embodiments, the term "user" may represent any employee, contractor, subcontractor, or the like of the entity, where the user performs one or more organization activities associated with the entity.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, conventional systems do not have the capability to provide an efficient way to identify provisions within legacy resources associated with an entity and a third party entity or a user and administer instructions provided by the legacy resources. As such, there exists a need for a system to electronically identify, maintain, monitor, and distribute designated resources associated with the legacy resources.

FIG. 1 provides a block diagram illustrating a system environment 100 for electronic identification of attributes for performing maintenance, monitoring, and distribution of designated resources, in accordance with an embodiment of the invention. As illustrated in FIG. 1, the environment 100 includes an NLP based processing system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200.

The entity system(s) 200 may be any system owned or otherwise controlled by an entity to support or perform one or more process steps described herein. In some embodiments, the entity is a financial institution.

The NLP based processing system 300 is a system of the present invention for performing one or more process steps described herein. In some embodiments, the NLP based processing system 300 may be an independent system. In some embodiments, the NLP based processing system 300 may be a part of the entity system 200.

The NLP based processing system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the NLP based processing system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the NLP based processing system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an NLP based processing application 250, one or more entity applications 270, and a data repository 280 comprising legacy resources 283, where the legacy resources 283 may include, but are not limited to, trust agreements. The one or more entity applications 270 may be any applications provided by the entity that perform one or more organization activities of the entity which may include processing transactions, administering trust associated with the trust agreements, or the like. The computer-executable program code of the network server application 240, the NLP based processing application 250, the one or more entity application 270 to perform certain logic, data-extraction, and data-storing functions of the entity system 200 described herein, as well as communication functions of the entity system 200.

The network server application 240, the NLP based processing application 250, and the one or more entity applications 270 are configured to store data in the data repository 280 or to use the data stored in the data repository 280 when communicating through the network communication interface 210 with the NLP based processing system 300, and/or the computing device system 400 to perform one or more process steps described herein. In some embodiments, the entity system 200 may receive instructions from the NLP based processing system 300 via the NLP based processing application 250 to perform certain operations. The NLP based processing application 250 may be provided by the NLP based processing system 300.

FIG. 3 provides a block diagram illustrating the NLP based processing system 300 in greater detail, in accordance with embodiments of the invention. As illustrated in FIG. 3, in one embodiment of the invention, the NLP based processing system 300 includes one or more processing devices 320 operatively coupled to a network communication interface 310 and a memory device 330. In certain embodiments, the NLP based processing system 300 is operated by an entity, such as a financial institution. In some embodiments, the NLP based processing system 300 is owned or operated by the entity of the entity system 200. In some embodiments, the NLP based processing system 300 may be an independent system. In alternate embodiments, the NLP based processing system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the NLP based processing system 300 described herein. For example, in one embodiment of the NLP based processing system 300, the memory device 330 includes, but is not limited to, a network provisioning application 340, a conversion application 350, a segmentation application 360, a vectorization application 370, one or more NLP models 380, and a data repository 390 comprising data processed or accessed by one or more applications in the memory device 330. The computer-executable program code of the network provisioning application 340, the conversion application 350, the segmentation application 360, the vectorization application 370, the one or more NLP models 380 may instruct the processing device 320 to perform certain logic, data-processing, and data-storing functions of the NLP based processing system 300 described herein, as well as communication functions of the NLP based processing system 300.

The network provisioning application 340, the conversion application 350, the segmentation application 360, the vectorization application 370, the one or more NLP models 380 are configured to invoke or use the data in the data repository 390 when communicating through the network communication interface 310 with the entity system 200, and/or the computing device system 400. In some embodiments, the network provisioning application 340, the conversion application 350, the segmentation application 360, the vectorization application 370, the one or more NLP models 380 may store the data extracted or received from the entity system 200, and the computing device system 400 in the data repository 390. In some embodiments, the network provisioning application 340, the conversion application 350, the segmentation application 360, the vectorization application 370, the one or more NLP models 380 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an NLP based processing application 421, entity application 424, an SMS application 423, or the like. The NLP based processing application 421 may comprise instructions to a graphical user interface (GUI) on the display 430 that allows the user 110 to interact with the entity system 200, the NLP based processing system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the NLP based processing application 421 provided by the NLP based processing system 300 allows the user 110 to access the NLP based processing system 300. In some embodiments, the entity application 424 provided by the entity system 200 and the NLP based processing application 421 allow the user 110 to access the functionalities provided by the NLP based processing system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a block diagram illustrating a process flow for electronic identification of attributes for performing maintenance, monitoring, and distribution of designated resources, in accordance with an embodiment of the invention.

As shown in block 505, the system extracts one or more legacy resources from a data repository of an entity system associated with an entity, wherein the legacy resources are in a first format. The one or more legacy resources may be any type of agreements. In some embodiments, the one or more legacy resources may be trust agreements associated with a third party entity, where the trust agreements may comprise one or more instructions associated with maintenance, monitoring, and distribution of designated resources within the trust agreements. In some embodiments, the first format of the one or more legacy resources may be based on the lifetime of the one or more legacy resources. For example, if a legacy resource is over twenty years old, the legacy resource may be a paper document which may be scanned and stored in an image format. In another example, if a legacy resource is one year old, the legacy resource may be in a portable document format.

As shown in block 510, the system converts the one or more legacy resources from the first format to a second format. Depending on the type of the first format, different techniques may be utilized to convert the one or more legacy resources into the second format, where the second format may be a text format. For example, if the first format is an image format, the system may Optical Character Recognition Technique to convert the one or more legacy resources in an image format to text format.

As shown in block 515, the system processes the one or more legacy resources, via one or more machine learning models. The one or more machine learning models may include, but are not limited to, Natural Language Processing (NLP) model. Different algorithms may be used in the one or more machine learning models. In some embodiments, a combination of algorithms may be used in the one or more machine learning models. The algorithms used in the one or more machine learning models may include, but are not limited to, classifier algorithms such as Logistic Regression algorithm, Random Forest Algorithm, Multinomial NB algorithm, or SVM algorithm. In one preferred embodiment of the present invention, Logistic Regression algorithm is used in at least one of the one or more machine learning models.

Processing the one or more legacy resources may comprise performing segmentation of data in the one or more legacy resources. Segmentation of the data may be based on a combination of different segmentation techniques. The one or more segmentation techniques may include, but are not limited to, newline character technique and period technique. The newline character technique splits the document based on newline in combination with special characters and/or tokens to capture the boundaries within the data. In some embodiments, tokens as used herein may be clauses or terms that may be used to identify one or more instructions provided in the one or more legacy resources. The period technique splits the document based on period in combination with one or more rules that are based on token length. In a preferred embodiment of the invention, the system uses both the newline character technique and the period technique to segment the one or more legacy resources.

Processing the one or more legacy resources may further comprise vectorizing the data in the one or more legacy resources. In some embodiments, vectorizing the data comprises converts the data from the second format to a third format. For example, the system may convert the data which is in a text format to a numeric format. Vectorizing the data may be based on a combination of one or more feature vectors, where each of the one or more feature vectors is based on a combination of different features. The features may include, but are not limited to, text length, number of tokens, average token length, clean index score of the legacy resource, start offset of a sentence in the legacy resource, 'x' number of columns with counts of each alphabet, 'y' number of columns with counts of token size, prefix and suffix additionally with the sentence, or the like. The system may perform vectorization of the data in the one or more legacy documents using a TF-IDF vectorizer, Word2Vec vectorizer, Doc2Vec vectorizer, or the like. In some embodiments, the system may use a combination of any of TF-IDF vectorizer, Word2Vec vectorizer, Doc2Vec vectorizer to perform vectorization of the data. In a preferred embodiment of the present invention, the system uses TF-IDF vectorizer. In some embodiments, the system also perform cross validation after processing the data in the one or more legacy resources.

As shown in block 520, the system identifies one or more attributes based on processing the one or more legacy resources via the one or machine learning models. The one or more attributes within the one or more legacy resources may include, but are not limited to, expense provisions, hire agents, affiliate securities, co-trustee expenses, individual delegation, corporate delegation, affiliate compensation, hire affiliates, statutory expenses, restrictions, fiduciary limit, or the like. Each of the one or more machine learning models is trained to identify an attribute of the one or more attributes. For example, if there are twelve attributes, twelve different machine learning models may be used to identify each of the twelve attributes. The one or more machine learning models are initially trained by the system using training data comprising sample legal resources comprising one or more paragraphs of text data, where the one or more attributes are highlighted in the one or more paragraphs of text data.

As shown in block 525, the system implements one or more actions based on the one or more attributes, where the actions may be associated with maintenance, monitoring, and distribution of designated resources. In some embodiments, the system automatically performs the one or more actions based on the one or more attributes. The one or more attributes may be identified and placed in different entity applications for the fast and dynamic implementation of the one or more actions. In some embodiments, the one or more actions may be performed after receiving an input from a user, where the input may be associated with verification of the one or more attributes identified by the system and/or permissions associated with the one or more actions. In an exemplary embodiment, the one or more actions may include collecting a certain amount of expenses provided by the expense provisions attribute while distributing the resources.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for electronic identification of attributes for performing maintenance, monitoring, and distribution of designated resources, the system comprising:
   a memory device with computer-readable program code stored thereon;
   a communication device; and
   a processing device operatively coupled to the memory device and the communication device, wherein the processing device is configured to execute the computer-readable program code to:
      extract one or more legacy resources from a data repository of an entity system associated with an entity, wherein the legacy resources are in a first format;
      convert the one or more legacy resources from the first format to a second format;
      process the one or more legacy resources, via one or more machine learning models, wherein processing the one or more legacy resources comprises:
         segmenting data in the one or more legacy resources by employing at least one of one or more segmentation techniques comprising a newline character technique and a period technique; and
         vectorizing the data in the one or more legacy resources via one or more feature vectors, wherein the one or more feature vectors are based on a combination of one or more features;
      identify one or more attributes based on processing the one or more legacy resources via the one or machine learning models; and
      implement one or more actions based on the one or more attributes.

2. The system according to claim 1, wherein segmentation of the data is based on a combination of at least two the one or more segmentation techniques.

3. The system according to claim 1, wherein vectorizing vectorization of the data converts the data from the second format to a third format.

4. The system according to claim 1, wherein the processing device is further configured to execute the computer-readable program code to vectorize the data based on using a combination of the one or more feature vectors that are based on one or more features comprising text length, number of tokens, average token length, clean index score of the one or more legacy resources, start offset of a sentence in the one or more legacy resources, number of columns with counts of each alphabet, number of columns with counts of token size, and prefixes and suffixes with the sentence.

5. The system of claim 1, wherein the processing device is further configured to execute the computer-readable program code to:
   perform cross-validation, in response to processing the one or more legacy resources.

6. The system according to claim 1, wherein each machine learning model of the one or more machine learning models identifies an attribute of the one or more attributes.

7. A computer program product for electronic identification of attributes for performing maintenance, monitoring, and distribution of designated resources, the computer program product comprising at least one non-transitory computer readable medium having computer-readable program code portions embodied therein, the computer-readable program code portions comprising executable portions for:
   extracting one or more legacy resources from a data repository of an entity system associated with an entity, wherein the legacy resources are in a first format;
   converting the one or more legacy resources from the first format to a second format;
   processing the one or more legacy resources, via one or more machine learning models, wherein processing the one or more legacy resources comprises:
      segmenting data in the one or more legacy resources by employing at least one of one or more segmentation techniques comprising a newline character technique and a period technique; and
      vectorizing the data in the one or more legacy resources via one or more feature vectors, wherein the one or more feature vectors are based on a combination of one or more features;
   identifying one or more attributes based on processing the one or more legacy resources via the one or machine learning models; and implementing one or more actions based on the one or more attributes.

8. The computer program product of claim 7, wherein segmentation of the data is based on a combination of the one or more segmentation techniques.

9. The computer program product of claim 7, wherein vectorizing the data converts the data from the second format to a third format.

10. The computer program product of claim 9, wherein the computer-readable program code portions comprising executable portions for vectorizing the data based on using a combination of the one or more feature vectors that are based on one or more features comprising text length, number of tokens, average token length, clean index score of the one or more legacy resources, start offset of a sentence in the one or more legacy resources, number of columns with counts of each alphabet, number of columns with counts of token size, and prefixes and suffixes with the sentence.

11. The computer program product of claim 7, wherein the computer-readable program code portions comprising executable portions for:
performing cross-validation, in response to processing the one or more legacy resources.

12. A computer-implemented method for electronic identification of attributes for performing maintenance, monitoring, and distribution of designated resources, the method comprising:
extracting one or more legacy resources from a data repository of an entity system associated with an entity, wherein the legacy resources are in a first format;
converting the one or more legacy resources from the first format to a second format;
processing the one or more legacy resources, via one or more machine learning models, wherein processing the one or more legacy resources comprises:
segmenting data in the one or more legacy resources by employing at least one of one or more segmentation techniques comprising a newline character technique and a period technique; and
vectorizing the data in the one or more legacy resources via one or more feature vectors, wherein the one or more feature vectors are based on a combination of one or more features;
identifying one or more attributes based on processing the one or more legacy resources via the one or machine learning models; and
implementing one or more actions based on the one or more attributes.

13. The computer-implemented method of claim 12, wherein segmentation of the data is based on a combination of the one or more segmentation techniques.

14. The computer-implemented method of claim 12, wherein vectorizing the data converts the data from the second format to a third format.

15. The computer-implemented method of claim 14, wherein vectorizing the data based on using a combination of the one or more feature vectors that are based on one or more features comprising text length, number of tokens, average token length, clean index score of the one or more legacy resources, start offset of a sentence in the one or more legacy resources, number of columns with counts of each alphabet, number of columns with counts of token size, and prefixes and suffixes with the sentence.

16. The computer-implemented method of claim 12, wherein the method further comprises:
performing cross-validation, in response to processing the one or more legacy resources.

17. The computer-implemented method of claim 12, wherein each machine learning model of the one or more machine learning models identifies an attribute of the one or more attributes.

* * * * *